Patented May 17, 1927.

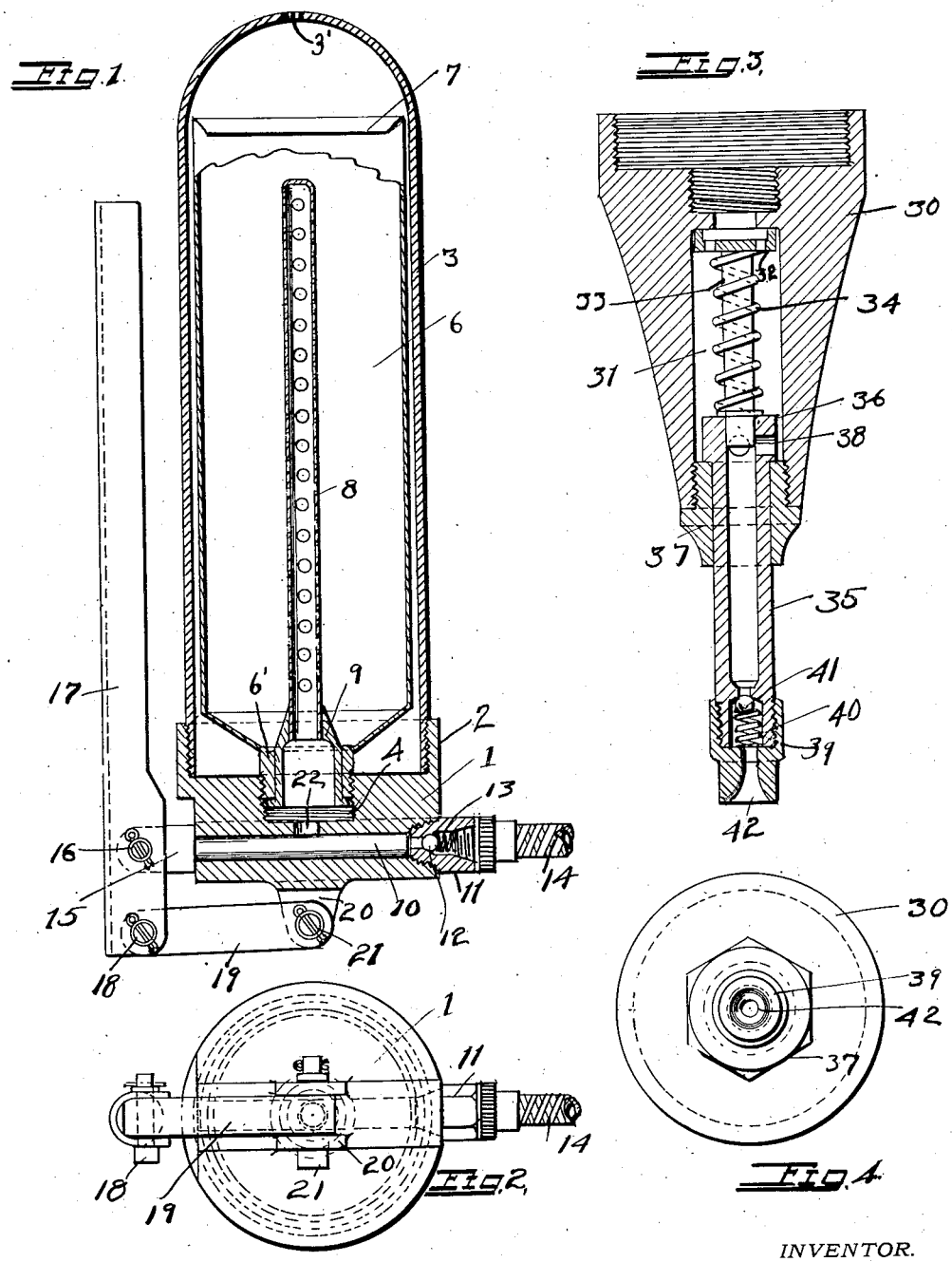

1,628,834

UNITED STATES PATENT OFFICE.

MILTON A. FRANK, OF SAN FRANCISCO, CALIFORNIA.

HIGH-PRESSURE VACUUM GREASE GUN.

Application filed January 25, 1926. Serial No. 83,490.

This invention relates to a high pressure vacuum grease gun, the object of which is to provide means whereby a charge of grease is used in the gun, may be easily applied thereto, and fed therefrom under a sufficiently high pressure to clean out the bearing to which the grease is applied. The several fresh charges of the grease for the gun are contained within a collapsible lead tube such as is commonly supplied to the trade.

Another object of the invention is to provide means whereby the collapsible tube may be protected during the time the grease is being used therefrom, while the protecting casing serves as one handle of the pressure creating mechanism.

Another object of the invention is to provide means whereby the grease gun will be supplied with grease by a vacuum created by the plunger used for creating the high pressure on the forward stroke of the piston.

Another object of the invention is to provide a grease gun of this type which may be applied to several different kinds of high pressure grease fittings.

An embodiment of the invention is shown in the accompanying drawings in which the same reference numeral is applied to the same portion throughout the several figures of the drawings, and of which there may be modifications.

Figure 1 is a longitudinal sectional view of the complete grease gun,

Figure 2 is a bottom plan view of the same,

Figure 3 is a vertical sectional view of a base as used in connection with a type of fitting which simply requires the grease gun to be pressed against the fitting, and, Figure 4 is a bottom plan view of the fittings shown in Figure 3.

The grease gun is built upon a base 1, which has a threaded flange at 2 to receive the cover 3. The base is also threaded at 4 to receive the threaded end 6' of a soft lead grease tube 6.

This grease tube is provided with a plate at 7 to close that end of the tube, said plate pinching the two sides of the lead tube together in a well known manner.

Inside the tube there is a perforated tube 8 which is connected to the threaded member 6' by means of a larger tubular end 9. The object of the tube 8 is to prevent the lead tube from collapsing in such a manner as to prevent the escape of grease therefrom.

Transversely extending across the base 1 there is a bore which receives a small plunger 10, and in one end of which the threaded fitting 11 is screwed.

The fitting 11 has a ball valve 12 which is held upon its seat by a spring 13, and it has connected thereto a flexible pipe or tube 14 which has a suitable fitting at its other end to connect with any desired pressure lubrication system.

The plunger 10 has a yoke 15 which is pivotally connected at 16 to the lever 17. This lever is pivotally connected at 18 to a link 19, which in turn, is pivotally connected to lugs 20 by means of the pin 21.

Immediately under the center tube 8, there is an opening into the bore fitting the piston rod 10, and when the piston 10 is pulled to its outermost position the ball 12 will prevent air from getting into the chamber in which the rod 10 operates, so this will cause a sufficient vacuum to draw the grease into the space left vacant by the withdrawal of the rod 10, and when the pressure is applied thereto the rod 10 will almost instantly cut off the communication with the hole 22, and thereby force the grease through the pipe 14 at a pressure of several thousand pounds per square inch depending upon the resistance offered. The cover 3 is open to the atmosphere at 3'. It will be seen that the lead nozzle of the tube 6' is forced down into the threaded opening in the base 1 sufficiently tight to prevent any access of air to the chamber in which the rod 10 is movable, and thereby to cause a fresh charge of grease to be forced by the atmosphere into the gun bore ahead of the plunger 10 each time it is used.

In the event that it is desired to use a type of greasing device similar to that of those grease guns which operate by simply pushing the grease gun against the high pressure fixture the type of base shown in Figure 3 may be used. This consists of a flanged base 30 to receive the cover 3 and lead tube of grease, and within which there is a chamber 31.

In this chamber there is a base 32 which has a series of holes in it to allow the passage therethrough of the grease, and this base carries the small piston 33. This piston has a spring 34 surrounding it which holds the tubular member 35 in the position shown in Figure 3 normally, a collar 36 preventing the grease from passing beyond the threaded bushing 37, and preventing the tube 35 from passing out of the said bushing.

The end of the rod 33 is arranged so that it barely passes the hole 38 and at the other end of the tube 35 it has the threaded fitting 39 which fits the greasing fixture on the bearings. This member 39 holds the spring 40 in place, and the spring holds the valve 41 in place.

In the event that a person desires to make use of the grease gun its flaring opening 42 in the fitting 39 is pressed on the greasing fitting and pressure is applied to the opposite end of the grease gun. This allows the tube 35 to slide on the piston rod 33 and thereby expel the desired charge of grease from the gun.

It will be seen that this grease gun dispenses entirely with the use of grease en masse in the cover 3, and substitutes therefor a convenient tube of grease which can be screwed into connection with the grease gun base for use therein.

The plunger 33 has a perforated and flanged base 33' to hold it straight in the bore 31 of the head 30. It will be clear that the only object of the tube 8 is to provide access to the threaded nozzle 6' of the grease tube 6 for the grease at all times, regardless of the collapsed condition of the lead tube and that it may be made of any desired kind of foraminous material either a tube or a screen.

Having thus described my invention, what I desire to secure by Letters Patent of the United States is as follows, but modifications may be made in carrying out the invention as shown in the drawings and in the above particularly described form thereof, within the purview of the annexed claims.

I claim:

1. A high pressure grease gun comprising a base, means to expel successive charges of grease therefrom at high pressure, an upwardly projecting rigid cover detachably secured to said base, a passage in said base leading from said expelling means to the interior of said cover, a socket about said passage for supporting a grease receptacle.

2. A high pressure grease gun comprising a base, means to expel successive charges of grease therefrom at high pressure, an upwardly projecting rigid cover detachably secured to said base, a passage in said base leading from said expelling means to the interior of said cover, a socket about said passage for supporting a grease receptacle and a perforated tube supported in said socket and adapted to project up into the grease receptacle.

In testimony whereof I have hereunto set my hand this 19" day of January A. D. 1926.

MILTON A. FRANK.